United States Patent [19]

Ohsawa

[11] Patent Number: 4,820,023
[45] Date of Patent: Apr. 11, 1989

[54] VOLTAGE ADJUSTING APPARATUS
[75] Inventor: Toshifumi Ohsawa, Kawasaki, Japan
[73] Assignee: Canon Kabushiki Kaisha, Tokyo, Japan
[21] Appl. No.: 139,383
[22] Filed: Dec. 30, 1987
[30] Foreign Application Priority Data Jan. 12, 1987 [JP] Japan .................................. 62-3129

[51] Int. Cl.⁴ ........................... G02F 1/13; G09G 3/18
[52] U.S. Cl. ................................. 350/331 R; 350/332; 354/484; 340/765
[58] Field of Search .......................... 350/331 R, 332; 354/403, 452, 464, 484, 418; 364/571; 323/323; 340/765, 784, 794, 805, 811

[56] References Cited
U.S. PATENT DOCUMENTS 4,414,545 11/1983 Sakurada et al. .................... 340/784
4,553,140 11/1985 Maida .................................. 354/484
4,630,917 12/1986 Maida et al. ........................ 354/464
4,645,326 2/1987 Kiuchi et al. ....................... 354/484
4,652,916 3/1987 Suzaki et al. .................... 350/331 R

FOREIGN PATENT DOCUMENTS 59-10932 1/1984 Japan .

Primary Examiner—Stanley D. Miller
Assistant Examiner—Huy K. Mai
Attorney, Agent, or Firm—Fitzpatrick, Cella, Harper & Scinto

[57] ABSTRACT

A voltage adjusting apparatus which may be used in a camera. Digital signals from a data setting member are directed by a central processing unit to a random access memory and from there to a digital to analog converter. The output of the converter and a reference voltage are processed in an operational amplifier to produce an output voltage. If the output voltage is not within a desired range, new signals are supplied from the data setting member.

7 Claims, 4 Drawing Sheets

VOLTAGE ADJUSTING APPARATUS

BACKGROUND OF THE INVENTION

1. Field of the Invention

This invention relates to an electrical adjusting apparatus which may be used for supplying a desired electrical energy value (e.g. voltage) to a device such as a liquid-crystal driving device in a camera.

2. Description of the Prior Art

In a liquid-crystal driving device provided in a camera, if the power source's voltage changes owing to the operation of a heavy load such as motor or a DC/DC converter in the camera, the voltage for driving the liquid-crystal driving device changes correspondingly, resulting in difficulty in controlling the turning on and off of segments of the liquid-crystal display element and, hence, a reduction in the accuracy of the display. Conventionally, to cope with this problem, a constant-voltage generating circuit is usually provided. However, due to manufacturing errors there is a certain degree of dispersion in the voltages generated by constant-voltage generating circuits, particularly those having driving sections constituted by ICs. It is difficult to limit this dispersion, particularly when the constant-voltage generating circuits are designed to have temperature compensation characteristics and are provided in dynamic drive systems. Nevertheless, this dispersion must be reduced.

Also there is a known device in which an external adjusting circuit element, such as a resistor, is provided to enable the liquid-crystal driving device to be supplied with a desired voltage. However, this method increases the number of parts and is disadvantageous in terms of space reduction. There are other methods, such as one in which a soldered resistor is replaced with one selected from resistors of different values, so as to obtain the desired voltage, or one in which a factory-adjusted resistor is used. However, these methods are also disadvantageous because they are time-consuming or they cannot ensure reliability during a long-term use.

Japanese Laid-Open Patent Application No. 54-10932 relates to a camera having an electrically erasable non-volatile memory which stores film sensitivity information but this patent does not disclose the use of an electrically erasable non-volatile memory as a means for memorizing manually adjustable data in a system for adjusting voltage or energy.

SUMMARY OF THE INVENTION

It is therefore an object of the present invention to overcome the above-described problems and provide a voltage adjusting apparatus capable of continuously supplying a stable desired voltage, without increasing the size of the apparatus.

It is another object of the present invention to provide a voltage adjusting apparatus suitable for a small apparatus such as, for example, a camera.

It is a still further object of the invention to provide novel energy adjusting apparatus for generating an adjustable electrical energy value for use in a device.

According to one aspect of the invention, a voltage adjusting apparatus is provided which comprises a reference voltage generator, an electrically erasable non-volatile memory, a digital to analog converter, a voltage supply and a controller. The memory is arranged to memorize an adjusted digital value to change the voltage supplied from the reference voltage generator. The digital to analog converter is arranged to convert the digital value in the memory to a corresponding analog voltage. The voltage supply is constructed and arranged to generate an adjustable voltage corresponding to the voltage from the reference voltage generator and the analog voltage value. The controller is connected to the memory and to the digital to analog converter and is arranged to supply a digital value, corresponding to the memorized digital value, to the digital to analog converter.

In another aspect, the invention provides a voltage adjusting apparatus comprising an electrically erasable non-volatile memory, a voltage supply and a controller. The memory is arranged to memorize a digital value corresponding to an adjustable voltage to be generated. The voltage supply has a digital to analog converter to convert the memorized digital value in the memory to a corresponding analog voltage value. The voltage supply is arranged to supply to a device the adjustable voltage corresponding to the analog voltage. The controller is connected to the memory and to the digital to analog converter and is arranged to supply the digital to analog converter with the memorized digital value.

In a further aspect of the invention, there is provided an electrical energy adjusting apparatus which comprises an electrically erasable non-volatile memory, an electrical energy supply and a controller. The memory is arranged to memorize a digital value corresponding to an adjustable electrical energy value. The energy supply has an analog to digital converter to convert the memorized digital value to a corresponding analog value. The electrical energy supply is also arranged to supply to a device, the adjustable electrical energy value corresponding to the analog value. Also, the controller is connected to the memory and to the digital to analog converter and is adapted to supply the memorized digital value to the digital to analog converter.

In a yet further aspect of the invention there is provided a voltage adjusting system which comprises a tool and a camera. The tool has a manually operable digital data setting device. The camera includes an electrical device supplied with a controllable voltage, an electrically erasable non-volatile memory, a voltage supply and a controller. The memory is arranged to memorize a digital value corresponding to an item of digital data supplied from the setting device. The voltage supply has a digital to analog converter to convert the digital value in the memory to a corresponding analog voltage. The voltage supply is arranged to supply the electrical device with a controllable voltage corresponding to the analog voltage. The controller is connected between the memory and the digital to analog converter and is adapted to supply the digital to analog converter with the memorized digital value.

DESCRIPTION OF THE PREFERRED EMBODIMENT

Figure 1:
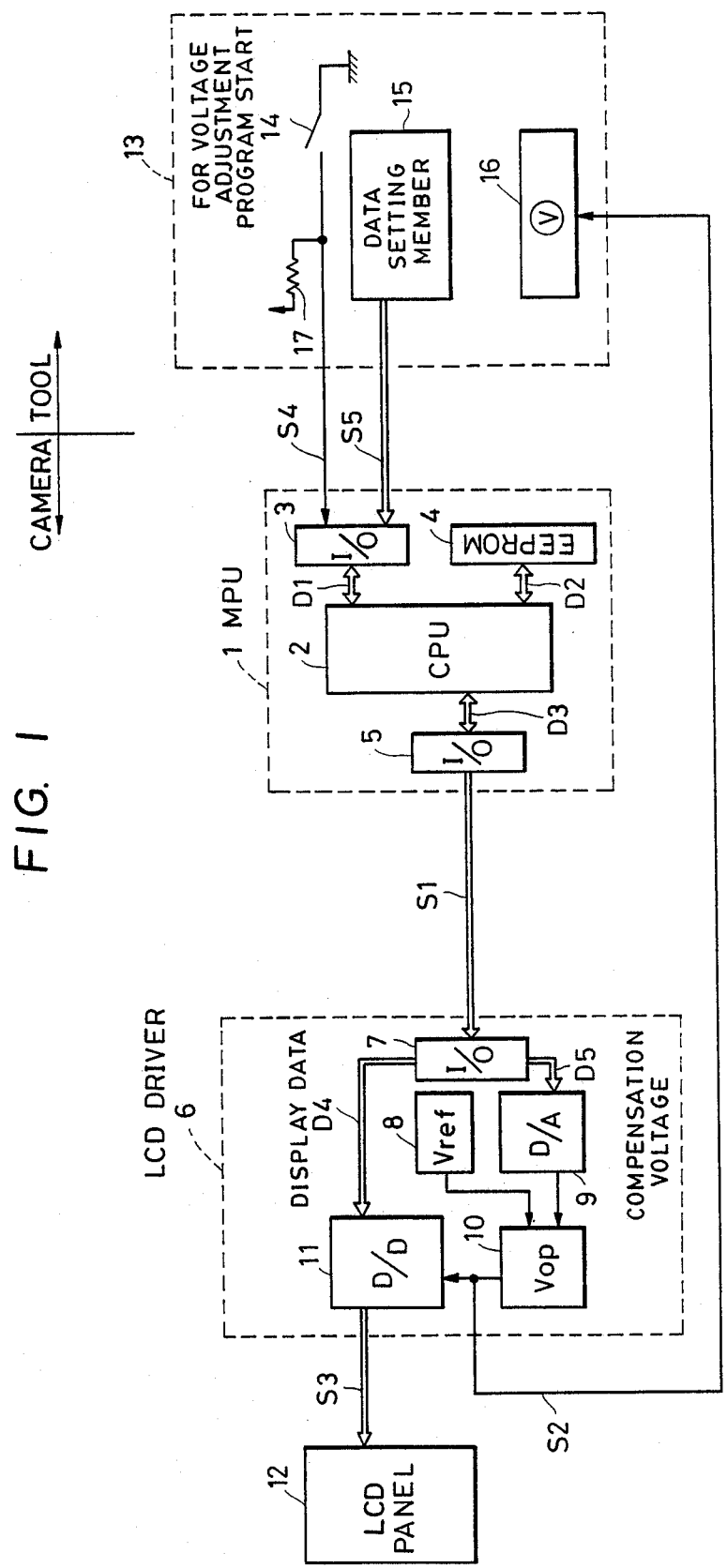
FIG. 1 is a block diagram of an embodiment of the present invention when applied to a camera.

Referring to FIG. 1, an MPU (microprocessor unit) 1 is provided with a controller comprising a CPU (central processing unit) 2 which has an ALU (arithmetic and logic unit), a ROM (read-only memory), a RAM (random-access memory), etc., and which is adapted to control the various operations of a camera. The MPU 1 is also provided with an I/O (input-output) port 3 through which the MPU is supplied with signals from outside, an EEPROM (electrically erasable and programmable read-only memory) 4 used as a non-volatile digital memory device that can be electrically overwritten, and an I/O communication port 5 for providing data transmission over a signal line S1 between the MPU 1 and an LCD driver 6. The LCD driver 6 has an I/O communication port 7 through which the LCD driver 6 receives display data or voltage adjustment data from the MPU 1; a reference voltage generator 8 which generates a reference voltage Vref for driving a liquid crystal; a D/A converter section 9 which converts voltage adjustment data supplied through the I/O communication port 7 to a compensation voltage Vn which is an analog value; a liquid-crystal driving voltage supply section 10 which adjusts the input reference voltage Vref by using the compensation voltage Vn supplied from the D/A converter section 9 and which outputs a compensated liquid-crystal driving voltage Vop; and a decoder-driver section 11 which operates in response to the supply of the liquid-crystal driving voltage Vop so as drive the liquid crystal by converting display data supplied through the I/O communication port 7 into numerals, symbols, or the like. A reference numeral 12 denotes an LCD panel on which the data supplied from the LCD driver 6 is displayed.

A tool 13 for setting voltage adjustment data is provided. The tool 13 is used in the final step of assembling the camera having the MPU 1, the LCD driver 6, and the LCD panel 12. The tool 13 is provided with a switch 14 for causing the MPU 1 to determine whether or not a voltage adjustment program stored in the MPU 1 should be activated. A data setting member 15 in the tool 13 is used to set voltage adjustment data. Also provided in the tool 13 are a voltmeter 16 which shows whether or not the liquid-crystal driving voltage Vop is within a predetermined range, and a pull-up resistance 17 which is connected to a power source (not shown).

Reference characters D1 to D5 indicate internal data buses, and reference characters S1 to S5 indicate signal lines.

Figure 2:
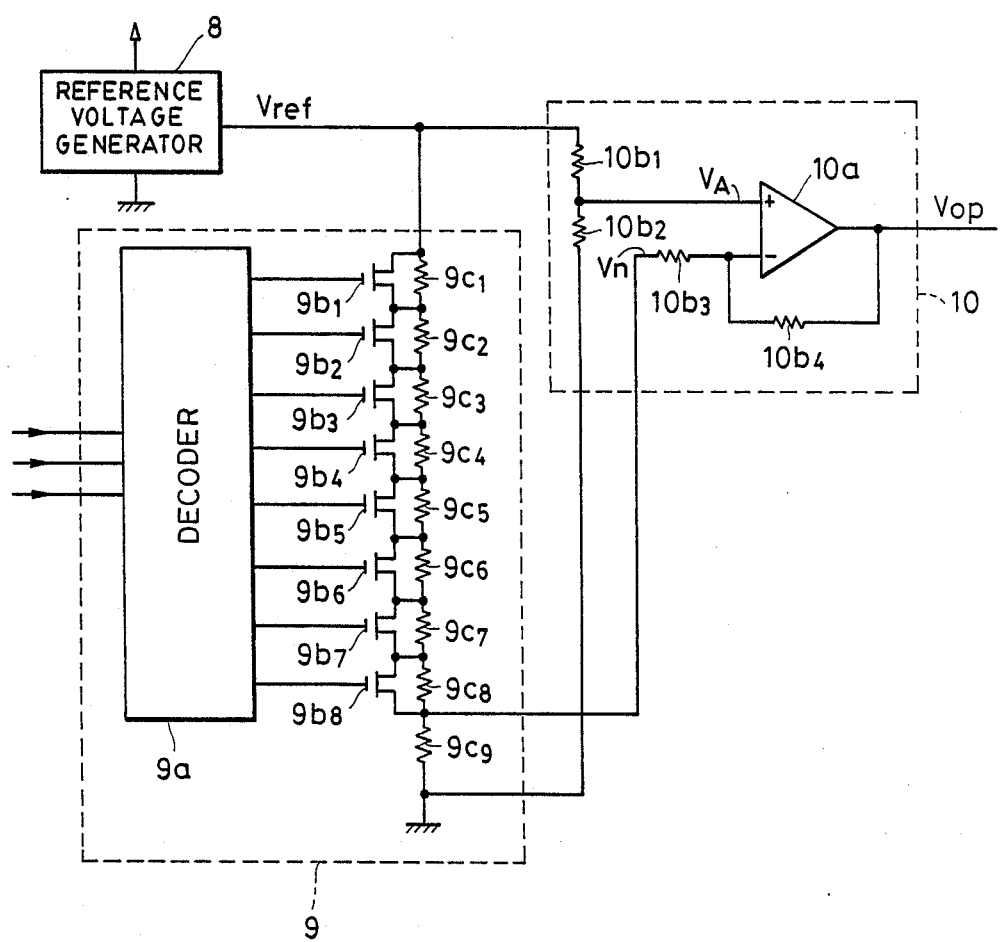
FIG. 2 is a circuit diagram of a D/A (digital to analog) converter section and a liquid crystal-driving voltage supply section shown in FIG. 1.

FIG. 2 shows the circuit arrangements of the D/A converter section 9 and the liquid-crystal driving voltage supply section 10 in the LCD driver 6. As shown in FIG. 2, the D/A converter section 9 is constituted by a decoder 9a, FETs (field effect transistors) $9b_1$ to $9b_8$, and resistors $9c_1$ to $9c_9$. The liquid-crystal driving voltage supply section 10 is constituted by an operational amplifier 10a and resistors $10b_1$ to $10b_4$.

Next, the operation of writing voltage adjustment data used when the camera is assembled will be described with reference to the flow chart shown in FIG. 3.

[Step 1] The switch 14 is turned on. The signal on line S4 (FIG. 1) is thereby inverted from high level (hereinafter referred to as "H level") to low level (hereinafter referred to as "L level").

[Step 2] Certain voltage adjustment data is set by the data setting member 15. For example, a digital value, which is Data [$000_B$] at an initial moment and which is a minimum value as a voltage adjustment voltage $V_B$, is set.

[Step 3] The power source (not shown) of the camera is turned on so that the MPU 1 and the LCD driver 6 are made ready for operation.

[Step 4] The MPU 1 starts to operate on the basis of the program stored therein.

Figure 4:
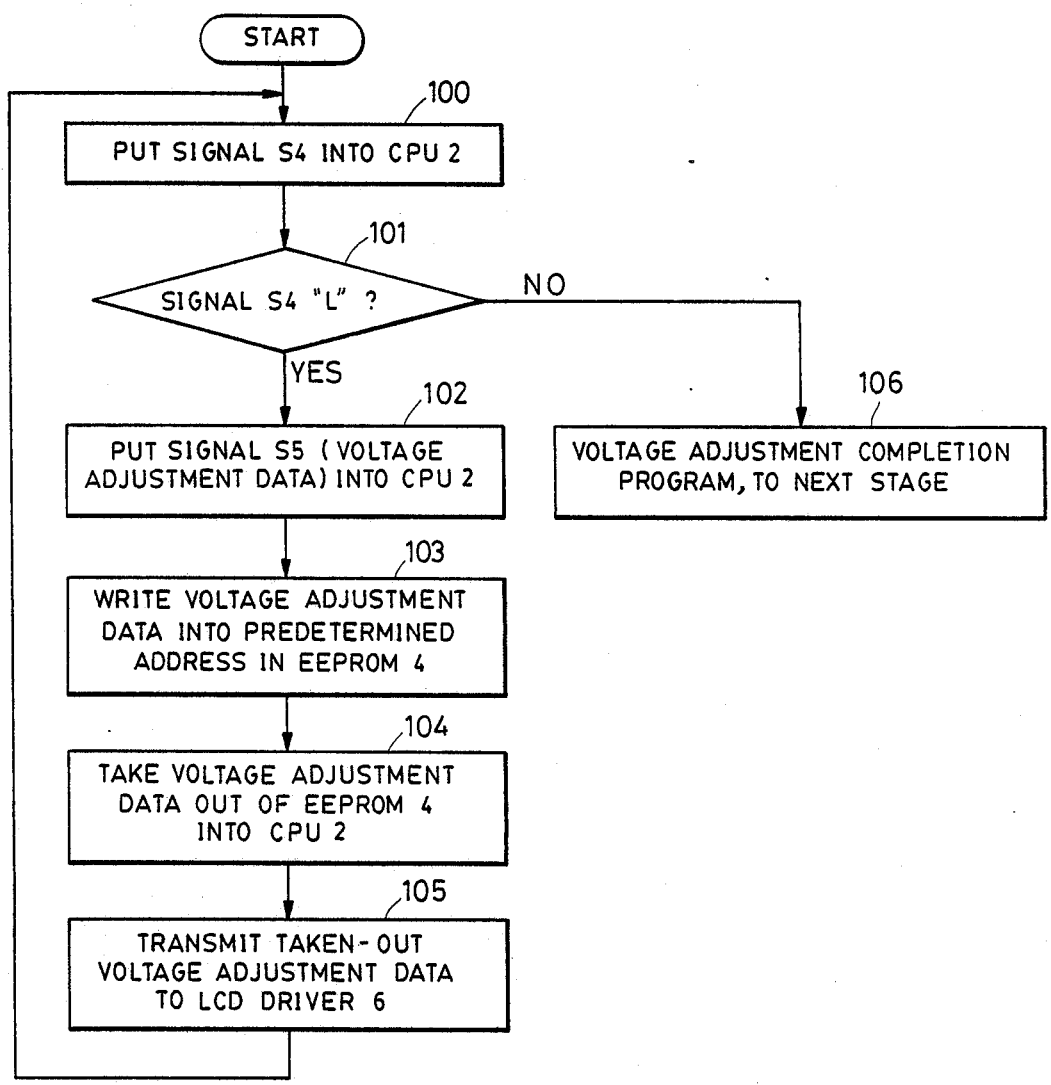
FIG. 4 is a flow chart of an MPU shown (microprocessor unit) in FIG. 1.

This operation of the MPU 1 will be described with reference to the flow chart shown in FIG. 4.

[Step 100] The signal on line S4 is input through the I/O port 3, and then to the CPU 2 via the internal bus D1.

[Step 101] A determination is made as to whether the signal S4 supplied to the CPU 2 is H level or L level. If it is determined that the signal S4 is H level, the process proceeds to Step 106 (voltage adjustment completion), and voltage adjustment is not executed. If it is determined that the signal S4 is L level, the process proceeds to Step 102.

[Step 102] The digital voltage adjustment data set by the data setting member 15 is input through the I/O port 3, and the content of this data is input to the CPU 2 via the internal bus D1.

[Step 103] The voltage adjustment data is written into a predetermined address in the EEPROM 4 via the internal bus D2.

[Step 104] The voltage adjustment data written in the predetermined address of the EEPROM 4 is again input to the CPU 2 and is transferred to the I/O communication port 5 via the internal bus D3.

[Step 105] The voltage adjustment data transferred from the I/O communication port 5 to the LCD driver via the signal line S1.

Figure 3:
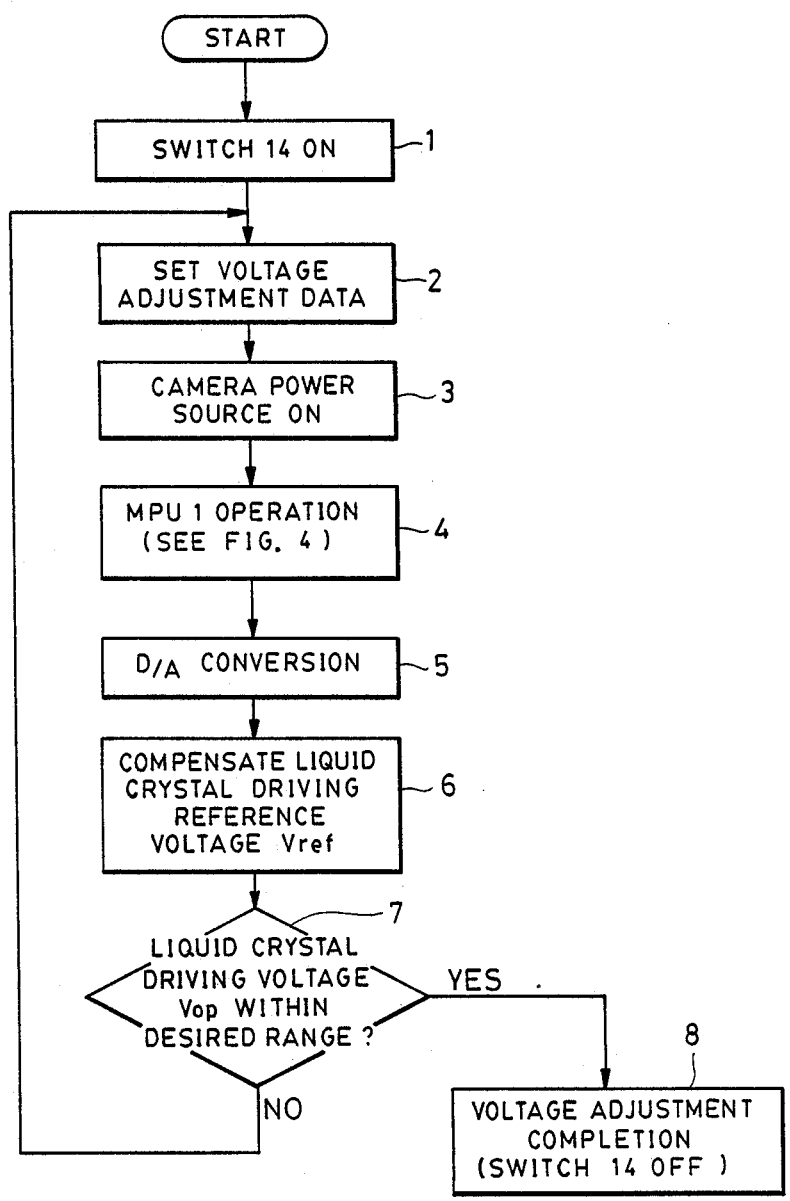
FIG. 3 is a flow chart of the overall entire operating process of the embodiments shown in FIGS. 1 and 2.

The process then returns to Step 5 of the flow chart shown in FIG. 3.

[Step 5] The voltage adjustment data transmitted from the MPU 1 is input through the I/O port 7, and this data (e.g., data represented by a 3-bit signal) is transferred via the internal bus D5 to the D/A converter section 9 arranged as shown in FIG. 2. Then, a signal of H level or L level which corresponds to the 3-bit signal is output from the decoder 9a so that each of the FETs $9b_1$ to $9b_8$ is switched on or off. As a result, the compensation voltage Vn is converted into an analog value (e.g. if the output data from the data setting member 15 is [000], all of the FETs $9b_1$ to $9b_8$ are off so that Vn is minimized to Vnmin); and this voltage is input into the liquid-crystal driving voltage supply section 10 in a subsequent stage.

[Step 6] The reference voltage Vref for driving the liquid crystal is supplied from the reference voltage generator 8 and is adjusted by using the compensation voltage Vn supplied from the D/A converter 9. That is, in the liquid-crystal driving voltage supply section 10 shown in FIG. 2, the liquid-crystal driving voltage Vop is obtained according to the calculation:

$$Vop = VA - (10b_4/10b_3)(Vn - VA)$$

where $VA = Vref \; 10b_2/(10b_1 + 10b_2)$. The liquid-crystal driving voltage Vop is output to the decoder-driver section 11 and to the voltmeter 16 in the tool 13.

[Step 7] The operator observes in the voltmeter 16 whether or not the liquid-crystal driving voltage Vop obtained at this time is within a desired range (a stable operation of the decoder-driver section 11 can be ensured by setting Vop within this range). If the voltage Vop is within the desired range, the process proceeds to Step 8.

[Step 8] The switch 14 is turned off, thereby completing the voltage adjustment process.

If in Step 7 the operator judges that the liquid-crystal driving voltage is not within the desired range, the process returns to Step 2, and the operations in Steps 2 to 7 are thereafter repeated until the voltage value falls into the desired range. That is, in Step 2, a new digital value [$001_B$] is set by the data setting member 15 and is written into the EEPROM 4. At the same time, the compensation voltage Vn, which is an analog value corresponding to this new digital value, is obtained by the D/A converter 9, and a determination is made as to whether or not the value of the reference voltage Vref adjusted in accordance with this compensation voltage (Vnmin=x mV) in the liquid-crystal driving voltage supply section 10 or the liquid-crystal driving voltage Vop is within the desired range. If it is still not within the desired range, a further digital value [$010_B$] is set. In this manner, different items of voltage adjustment data are set successively. For example, it is possible to determine the ranges and steps for the adjustment of Vop in such a manner that Vop is changed by steps of, for example, about 30 mV within a range of Vref of $\pm 120$ mV by selecting suitable values of the resistors $9c_1$ to $9c_9$ and $10b_1$ to $10b_4$. The optimum values and number of dividing resistors may be selected depending on the types of individual systems. This adjusting operation is repeated until the liquid-crystal driving voltage Vop falls into the desired range. If, after this operation has been repeated, it is determined that the liquid-crystal driving voltage Vop is within the desired range, the switch 14 is turned off as described above (Step 8), and the tool 13 and the camera are disconnected from each other. A digital input device of the D/A converter section has data-latch functions, so that, once an item of data is input into the D/A converter 9, the D/A converter retains an analog output obtained from the latest digital data until it is supplied with a new item of data.

The voltage adjustment operation performed on the camera after the tool 13 and the camera have been disconnected will be described below. The voltage adjustment data that has been written in the predetermined address of the EEPROM 4 by the above-described operation is read by the CPU 2 when the power source of the camera is turned on in order to use the camera. This data is thereafter sent to the LCD driver 6, and the desired liquid-crystal driving voltage Vop, that has been compensated by the D/A converter section 9 in the LCD driver 6 and the liquid-crystal driving voltage supply section 10, is supplied to the decoder-driver section 11. Thus, the display on the LCD panel 12 is maintained continuously and with high accuracy.

As can be understood from the above description, the voltage adjustment involves not only the operation of writing suitable voltage adjustment data into the EEPROM 4 by using the tool 13 but it also involves the operation of compensating the reference voltage in accordance with the voltage adjustment data written into the EEPROM 4 in the camera after the tool 13 has been removed therefrom. That is, the voltage adjusting apparatus in accordance with the present invention adjusts the reference voltage Vref to the desired voltage on the basis of the above-described voltage compensation.

In accordance with this embodiment, during a camera operation, voltage adjustment is performed by the EEPROM 4, the CPU 2, the reference voltage generator 8, the D/A converter section 9 and the liquid-crystal driving voltage supply section 10, thereby eliminating the need for the provision of any external resistor and, hence, improving the space factor and avoiding time-consuming soldering operations. The present invention is also more advantageous in terms of the space factor and reliability than the type of apparatus which use factory-adjusted resistors. The apparatus in accordance with the present invention can be controlled by a computer and is, therefore, together with its circuit design, most suited for late model electronically controlled cameras.

In the above-described embodiment, voltage adjustment data is written in the EEPROM 4 by using the external tool 13. However, this type of tool may be provided in the camera, or the CPU 2 may be designed to perform a similar operation. That is, the CPU 2 automatically changes the voltage adjustment data while monitoring the liquid crystal driving voltage Vop, writes the present voltage adjustment data into the EEPROM 4 by determining that Vop is within the desired voltage range, and thereafter performs voltage adjustment on the basis of this data. As described above, the present invention provides a voltage adjusting apparatus having a rewritable memory which contains a digital value corresponding to a compensation voltage and which overwrites that value in response to the input of a new digital value; a D/A converter which converts the digital value stored in the memory into a compensation value which is an analog value and outputs this converted value to a voltage compensator; a controller which reads the digital value from the memory and outputs that value to the D/A converter. This apparatus performs voltage adjustment on the basis of the digital value stored in the memory if the voltage to be adjusted does not match the desired voltage, thereby enabling a stable supply of the desired voltage without increasing the size of the apparatus.

What is claimed is:

1. A voltage adjusting apparatus for generating an adjustable voltage for use in a device, comprising:
    a reference voltage generator for generating a reference voltage;
    an electrically erasable non-volatile memory for memorizing an adjusted digital value to change the voltage supplied from said reference voltage generator;
    a digital to analog converter for converting the memorized digital value in said memory to a corresponding analog voltage;
    a voltage supply for generating an adjustable voltage corresponding to the voltage from said reference voltage generator and the analog voltage value from said digital to analog converter; and
    a controller connected to said memory and to said digital to analog converter and arranged to supply a digital value corresponding to the memorized digital value to said digital to analog converter.

2. A voltage adjusting apparatus according to claim 1, wherein said electrically erasable non-volatile memory is a programmable read only memory.

3. A voltage adjusting apparatus according to claim 1, and further including a decoder driver for a liquid crystal display connected to the voltage supply.

4. A voltage adjusting apparatus for generating an adjustable voltage for use in a device, comprising:
- an electrically erasable non-volatile memory for memorizing a digital value corresponding to the adjustable voltage;
- a voltage supply having a digital to analog converter to convert the memorized digital value in said memory to a corresponding analog voltage value, the voltage supply being arranged to supply the device with the adjustable voltage corresponding to the analog voltage; and
- a controller connected to said memory and to said digital to analog converter and arranged to supply said digital to analog converter with the memorized digital value.

5. An electrical energy adjusting apparatus for generating an adjustable electrical energy value for use in a device, comprising:
- an electrically erasable non-volatile memory for memorizing a digital value corresponding to the adjustable electrical energy value;
- an electrical energy supply having a digital to analog converter to convert the memorized digital value in said memory to a corresponding analog value, said electrical energy supply being arranged to supply said device with said adjustable electrical energy value corresponding to said analog value; and
- a controller connected to said memory and to said digital to analog converter and adapter for supplying said digital to analog converter with the memorized digital value.

6. A voltage adjusting system comprising a tool and a camera, said tool having a manually operable digital data setting device and said camera including an electrical device supplied with a controllable voltage, an electrically erasable non-volatile memory for memorizing a digital value corresponding to an item of digital data supplied from said setting device, a voltage supply having a digital to analog converter to convert the memorized digital value in said memory to a corresponding analog voltage, said voltage supply arranged to supply said electrical device with said controllable voltage corresponding to said analog voltage, and a controller connected between said memory and the digital to analog converter and is adapted to supply said digital to analog converter with the memorized digital value.

7. A voltage adjusting system according to claim 6, wherein said electrical device includes a decoder driver for a liquid crystal display.

* * * * *

UNITED STATES PATENT AND TRADEMARK OFFICE
CERTIFICATE OF CORRECTION

PATENT NO. : 4,820,023
DATED : April 11, 1989
INVENTOR(S) : Ohsawa

It is certified that error appears in the above-identified patent and that said Letters Patent is hereby corrected as shown below:

COLUMN 2

Line 67, delete "shown".

Line 68, change "unit) in" to --unit) shown in--.

COLUMN 3

Line 32, change "drive" to --to drive--.

COLUMN 4

Line 61, change "VOp=VA-(10b$_4$/10b$_3$)(Vn-VA)" to Vop=V$_A$-(10b$_4$/10b$_3$)(Vn-V$_A$).

Line 63, change "VA" to --V$_A$--.

COLUMN 8  Line 20, delete "is".

Signed and Sealed this

Sixth Day of March, 1990

Attest:

JEFFREY M. SAMUELS

Attesting Officer          Acting Commissioner of Patents and Trademarks